United States Patent [19]
Fischer et al.

[11] Patent Number: 5,861,222
[45] Date of Patent: Jan. 19, 1999

[54] GAS DIFFUSION ELECTRODE FOR MEMBRANE FUEL CELLS AND METHOD OF ITS PRODUCTION

[75] Inventors: Andreas Fischer, Frankfurt; Hartmut Wendt, Dieburg; Ralf Zuber, Grossostheim, all of Germany

[73] Assignee: Degussa Aktiengesellschaft, Frankfurt am Main, Germany

[21] Appl. No.: 822,864

[22] Filed: Mar. 24, 1997

[30] Foreign Application Priority Data

Mar. 23, 1996 [DE] Germany ............... 196 11 510.8

[51] Int. Cl.[6] .................................................. H01M 4/86
[52] U.S. Cl. ................. 429/42; 429/40; 429/41; 429/44; 204/282; 204/283; 204/284; 204/296; 521/27; 521/28; 106/1.22; 106/122; 502/4; 502/22; 502/27; 502/101
[58] Field of Search .................... 429/45, 44, 42, 429/41, 40; 204/283, 282, 284, 296; 521/27, 28; 106/1.21, 122; 502/4, 22, 27, 101

[56] References Cited

U.S. PATENT DOCUMENTS

| | | | |
|---|---|---|---|
| 3,385,780 | 5/1968 | Feng | 204/294 |
| 4,469,579 | 9/1984 | Covitch | 204/283 |
| 4,536,272 | 8/1985 | Blanchart et al. | 429/42 |
| 4,876,115 | 10/1989 | Raistrick | 427/115 |
| 5,211,984 | 5/1993 | Wilson | 427/115 |
| 5,316,871 | 5/1994 | Swathirajan et al. | 429/44 |
| 5,489,563 | 2/1996 | Brand et al. | 429/44 |
| 5,523,177 | 6/1996 | Kosek et al. | 429/40 |

FOREIGN PATENT DOCUMENTS

| | | |
|---|---|---|
| 0622861 | 11/1994 | European Pat. Off. |
| 1546701 | 11/1970 | Germany |

*Primary Examiner*—Bruce F. Bell
*Attorney, Agent, or Firm*—Beveridge, DeGrandi, Weilacher & Young, L.L.P.

[57] ABSTRACT

A porous gas diffusion electrode for membrane fuel cells on an ion-conducting polymer. The electrode contains a finely divided electrocatalyst which is dispersed in a proton-conducting ionomer and has a total porosity of more than 40 to less than 75%. It supplies considerably improved performance data in comparison to known electrodes. The electrode can be produced by using pore-forming materials which are dissolved during the re-protonation of the ion-conducting polymers with sulfuric acid or are decomposed by the action of temperature.

26 Claims, 3 Drawing Sheets

GAS DIFFUSION ELECTRODE FOR MEMBRANE FUEL CELLS AND METHOD OF ITS PRODUCTION

INTRODUCTION AND BACKGROUND

The present invention relates to a porous gas diffusion electrode for membrane fuel cells on an ion-conducting polymer membrane as well as to a method of its production. The use of gas diffusion electrodes for fuel cells has long been state of the art. Several methods for producing these electrodes have been developed for the membrane fuel cell using electrocatalysts based on platinum catalysts or platinum alloy catalysts on conductive carbon carriers.

The control of the contact of the three phases catalyst/electrolyte/gas has proven to be particularly difficult in a solid electrolyte system such as is constituted by a membrane fuel cell with an ion-conducting membrane as electrolyte. Traditional gas diffusion electrodes for use in acidic fuel cells (e.g. the phosphoric-acid fuel cell) are generally produced from a mixture of polytetrafluoroethylene (PTFE) and an electrocatalyst of platinized black which mixture is absorbed on a gas distributor structure. After a tempering procedure this yields a porous, surface-rich and partially hydrophilic, partially hydrophobic structure of the electrode. This enables, during operation in a fuel cell with a liquid electrolyte, good access of the working gases to the electrochemically active centers with simultaneous good wetting by the electrolyte. The entrance of the liquid electrolyte into the depth of the electrode opens up a sufficiently high number of these electrochemically active centers.

A membrane fuel cell consists of, in its essential components, a membrane of an ion-conducting polymer, also designated herein as "ionomer", with gas diffusion electrodes applied on both of its sides as cathode and anode of the fuel cell. The membrane has two large surface areas, or sides and a relatively small thickness. The cathode and anode electrode contain suitable fine electrocatalysts for accelerating the oxidation of the fuel, as a rule hydrogen, on the anode and reduction of the oxygen on the cathode. The polymer membrane forms the electrolyte. The conduction of current through the membrane takes place by the transport of protons.

Platinum is preferably used as the catalytically active component of the electrocatalyst, which platinum can also be alloyed with one or several metals of the groups VB, VIB, VIII and IB of the Periodic Table of Elements. The optimum particle size of the catalytically active alloy particles is in a range of 2 to 10 nm. For use in the electrodes of fuel cells the catalytically active components are employed as carrier catalysts, that is, the metal or alloy particles are deposited on a carrier which can be finely divided, electrically conductive carbon materials such as e.g. furnace black and worked in this form into the electrodes. Alternatively, however, there is also the possibility of bringing the alloy particles directly into the electrode material without carrier.

The access of the electrolyte into the depths of the electrode is not readily possible in a membrane fuel cell. The so-called three-phase zone remains, without special provisions, limited to the range of the contact surfaces between membrane and electrodes.

U.S. Pat. No. 4,876,115 teaches a method of modifying commercial gas diffusion electrodes which are usually used in liquid electrolyte systems. These electrodes contain as binder hydrophobic particles of polymeric PTFE, which simultaneously regulates the wetting properties of the electrode and stabilizes the porosity of the electrode layer. In order to improve the contact of the three phases; i.e. catalyst/electrolyte/gas, the prefabricated electrode is impregnated with a solution of a proton-conducting material by spraying and then bringing into contact the sprayed side with the proton-conducting membrane. The porosity of the electrode is formed only by the intermediary spaces between the particles of the electrocatalyst and of the hydrophobic PTFE.

If the electrode is impregnated with an ionomer as proton-conducting material only approximately 10 $\mu$m of the depth of the electrode is reached by the electrolyte as a result of this pretreatment. Therefore, a large part of the electrocatalyst remains electrochemically unused in the electrode, which is generally 100 to 200 $\mu$m thick. Performance data similar to that obtainable with conventional electrodes with surface concentrations of 4 mg Pt/cm$^2$ can be achieved with these electrodes at surface concentrations of 0.35 to 0.5 mg Pt/cm$^2$. However, the maximum concentration when using carrier catalysts is limited to values of approximately 0.5 mg Pt/cm$^2$ on account of the electrochemical utilizable layer thickness, which is only about 10 $\mu$m thick. A performance increase by raising the surface concentration of catalyst is therefore possible only to a slight extent. This excludes those electrodes from applications which, according to the current state of knowledge, require catalyst concentrations of 4 mg Pt/cm$^2$ and more, as is necessary e.g. in a direct methanol fuel cell. In order to produce such electrodes with higher, electrochemically utilizable concentrations, carrier-free catalysts must be used.

The production of electrodes for membrane fuel cells by spraying a dispersion of dissolved ionomer, electrocatalyst and PTFE onto the heated membrane is described by S. Escribano et al. (Editions de l'Étcole Polytechnique de Montreal 1995, pp. 135–143). The electrodes are only a few micrometers thick and have pores with pore radii of approximately 50 nm. Thereafter, gas distributor structures are hot pressed onto the electrode layers. Temperatures near the melting point of PTFE (320°–360° C.) are used in that process in order to sinter the PTFE particles. PTFE functions in these electrodes as binder and hydrophobing agent.

According to U.S. Pat. No. 5,211,984 PTFE is eliminated as binder and hydrophobing agent and a non-self-supporting electrode is obtained consisting only of catalyst and ionomer. To this end a suspension of dissolved ionomer and platinized black is applied in a method variant onto a PTFE carrier, dried and the pre-formed electrode is pressed with the PTFE carrier onto a membrane. The PTFE carrier can subsequently be drawn off free of residue. The electrode with a thickness of approximately 10 $\mu$m adheres very well to the membrane after the hot pressing procedure.

The electrode produced in the manner shown in the prior art consists of a dense layer of ionomer and electrocatalyst. The electrode layer therefore contains essentially no pores and also no hydrophobic additives. The electrode layer is therefore limited to a maximum thickness of 10 $\mu$m. This maximum layer thickness also assures a sufficiently good transport of the oxygen to the catalyst particles by diffusion through the ionomer. A layer thickness of less than 5 $\mu$m is preferably striven for. Even these electrodes achieve performance data with surface concentrations of less than 0.35 mg Pt/cm$^2$ similar to that of conventional electrodes with concentrations of 4 mg Pt/cm$^2$. However, performance increases can hardly be achieved with these electrodes either when using carrier catalysts since the surface concentration can not be raised on account of the low layer thickness.

Ionomeric polymer membranes can be present in an acidic, proton-conducting H$^+$ form or, after exchange of the protons by monovalent ions such as e.g. Na⁺ and K⁺, in a non-acidic Na⁺ or K⁺ form. The non-acidic form of the polymer membranes is usually more resistant to temperature stresses than its acidic form. The membranes are therefore preferably used in their Na⁺ form for the applying of the electrode layers—likewise the ionomer present in solution for the electrode layer. In the last method step of the production of electrodes the polymeric material is transformed by so-called reverse protonation back into the acidic, proton-conducting form. This usually takes place by treating the unit consisting of electrode/membrane/electrode (EME-unit) in sulfuric acid.

According to U.S. Pat. No. 5,211,984 the robustness of the electrode layers can be further improved if the dissolved ionomer is present in a thermoplastic form in the suspension of catalyst and ionomer solution used to produce the electrode layer. The thermoplastic form is obtained by ion exchange of the proton-conducting form of the ionomer with e.g. tetrabutylammonium cations.

U.S. Pat. No. 4,469,579 describes the production of porous electrodes on solid electrolyte membranes for use in sodium chloride electrolysis cells. The electrodes are produced by spraying the membrane with a dispersion of an electrocatalyst in a solution of an ionomer, which dispersion can contain pore-forming materials in order to produce pores for the transport of the gases formed during the electrolysis. The pore-forming materials are dissolved out of the electrodes after removal of the solvent, that is, after drying of the electrodes.

Oxides, hydroxides, nitrates or carbides of various elements with particle sizes between 0.025 mm and 3 mm have been suggested in the prior art as pore-forming materials. Fibrous pore-forming materials with lengths up to 50 mm are preferably used. A preferred pore-forming material is zinc oxide, which is dissolved out of the electrode with sodium hydroxide solution after drying.

The German publication 15 46 701 corresponding to U.S. Pat. No. 3,385,780 discloses a method for the preparation of a porous electrode for fuel cells. According to the method described therein, a finely divided electrocatalyst is mixed with a hydrophobic polymer and a filler for the preparation of a first mixture. A second mixture is than prepared without the electrocatalyst. Both mixtures are than conveyed to a press in two separated sheets and are pressed at a pressure of 350 and 840 bar. Subsequently, the filler is removed so that a unitary porous body is obtained. The fillers that can be used include a thermally heat decomposable material or a material which can be leached out and removed with a strong base. Suitable fillers include ammonium oxalate, ammonium carbonate, silica gel, alumina and calcium carbonate. As hydrophobic polymers, there is mentioned polytetrafluoroethylene as an example. No disclosure is found in this publication of the porosities obtained in the resulting electrodes. Because of the high pressures used, it may be presumed that the electrode material is highly compacted and that the porosity is determined based only on the above mentioned fillers which are used and subsequently are removed in making the electrodes.

European 0 622 861A1 discloses a membrane electrode structure. In order to prepare the electrode, a so called ink is prepared which is formed of a 5% ionomer solution in 50% isopropanol, 25% methanol and 20% water, 1-methoxy, 2-propanol and platinum-C-catalyst (20% by weight platinum on Vulcan black). The ink is then printed on the polymeric membrane with the use of a screen printing procedure. Electrode coating and the membrane are subsequently pressed together at 127° C. under pressure of 20.7 bar. In the description of this patent application, it is mentioned that the electrode coating should be porous. An average pore diameter of 0.01 to 50 microns, preferably 0.1 to 30 microns and porosity of 10 to 99%, preferably 10 to 60% is described. However, for the person skilled in the art it is clear these porosities can not be realistically achieved with the described preparation procedures. This is equally true for the pore diameter as well as for the porosity.

The performance data of fuel cells is highly dependent on the oxidizing agent selected. Maximum values are obtained when pure oxygen is used. When air is used the performance data distinctly drops.

Polymer electrolyte fuel cells, which constitute the subject matter of this invention, are intended to be primarily used as current suppliers in vehicles. Therefore, the goal is to operate the fuel cells with air. The creation of successful gas diffusion electrodes for operation in air is therefore of decisive importance for the successful use of fuel cells as the energy source in motor vehicles.

An object of the present invention is to improve gas diffusion electrodes for membrane fuel cells in respect of performance data during operation in air.

A further object of the present invention is to improve operation of gas diffusion electrodes by controlling the interplay of the three phases of catalyst/electrolyte/gas.

A still further object of the present invention is to create a method of producing these improved gas diffusion electrodes.

SUMMARY OF THE INVENTION

The above and other objects of the invention are attained by a porous gas diffusion electrode for membrane fuel cells on a proton-conducting polymer membrane containing a finely divided electrocatalyst which is dispersed in the proton-conducting polymer. The electrode is characterized in that it has a porosity in a range of more than 40 to less than 75%. The electrode contains no hydrophobic polymer components as binder.

The proton-conducting polymer membrane preferably consists of a fluorocarbon vinyl ether copolymer which is also designated as a perfluorocarbon. Such a membrane is marketed e.g. under the trade name Nafion® by E. I. duPont. Membranes suitable for the invention have two large surface areas or side and a relatively small thickness in comparison with the sides.

According to the preferred aspect of the invention, the gas diffusion electrode has a concentration of platinum in a range of 0.01 to 4 mg Pt/cm².

In a still further aspect of the invention, the gas diffusion electrode has a thickness in a range of 5 to 100 $\mu$m.

Another feature of the present invention resides in a method of producing a porous gas diffusion electrode for membrane fuel cells on an ion-conducting polymer membrane by coating the membrane with a dispersion of a finely divided electrocatalyst and at least one pore-forming material in a solution of an ion-conducting polymer, which polymer membrane is present in a non-acidic, temperature-stable form and is heated during the coating to a temperature in a range of 130° to 170° C. The coating is then dried. Re-protonation of the membrane and electrodes in an acid follows. The pore-forming material is present in a finely divided form with an average particle size of 0.1 to 10 $\mu$m.

BRIEF DESCRIPTION OF THE DRAWINGS

The present invention will be further understood with reference to the drawings, wherein.

DETAILED DESCRIPTION OF INVENTION

According to the more detailed aspects of the invention, it is a feature that the electrode has a porosity in a range from more than 40 to less than 75%. The improved gas diffusion electrode for use in membrane fuel cells is achieved by coating the membrane with a dispersion of a finely divided noble metal containing electrocatalyst and at least one pore-forming material in a solution of an ion-conducting polymer. The polymer membrane is present in a non-acidic, temperature-stable state. The membrane is heated during the coating operature to a temperature in a range from 130° to 170° C. The coating is dried and then subjected to re-protonation and coating with an acid. The pore-forming material is present in a finely divided form with an average particle size from 0.1 to 10 $\mu$m.

The electrode produced in this way is suitable both as cathode and as anode. All catalysts known in the art of fuel cells as carrier catalysts or as carrier-free catalysts can be used as finely divided electrocatalysts. In the case of carrier catalysts, usually finely divided carbon blacks in graphitized or non-graphitized form are used as carrier. Platinum is the preferred noble metal, which can be alloyed with other metals such as cobalt, chromium, tungsten, molybdenum, iron, copper, nickel and ruthenium, and functions as the catalytically active component. A preferred noble metal alloy is e.g. platinum/cobalt/chromium, with particle sizes in a range of 2 to 10 nm, is deposited on the blacks.

The electrode can have layer thicknesses in a range from 5 to 100 $\mu$m. With a thickness of less than 5 $\mu$m the electrode becomes increasingly less cohesive due to its high porosity. Above 100 $\mu$m thickness the electrochemical usefulness of the layer slowly decreases in spite of the high porosity.

The large layer thickness range available makes possible surface concentrations of electrocatalysts of 0.01 to 4 mg Pt/cm$^2$. Carrier electrocatalysts with 5 to 40% by weight platinum relative to the total weight of the catalyst can be used for this purpose. The weight ratio between the ionomer of the layer and the finely divided electrocatalyst dispersed therein can be selected to be from 1:1 to 1:10. If the amount of ionomer in the total weight of the electrode is too high the accessibility of the catalytic particles for the gases is adversely affected. On the other hand, if the amount of ionomer is too low, there results an insufficient bonding of the catalytic particles into the ionomer material.

In order to produce the gas diffusion electrode in accordance with the invention a coating dispersion of the finely divided electrocatalyst is prepared in a solution of the ion-conducting polymer and sprayed onto the polymer membrane to be coated.

To this end the ion-conducting polymer membrane is used in a non-acidic, temperature-stable condition and heated during the spray coating to a temperature in a range of 130° to 170° C. In addition to the electrocatalyst, a pore-forming material or a mixture of various pore-forming materials with an average particle size in a range of 0.1 to 10 $\mu$m is added to the coating dispersion. After the drying of the electrode coating the ionomeric material of the system of electrode/membrane/electrode is converted into the proton-conducting form by treatment with a suitable acid, usually a mineral acid such as 1N sulfuric acid.

The pore-forming material suitable for purposes of the present invention can be a substance which is dissolved by the acid during the necessary re-protonation of the ionomeric material. Preferred pore-forming materials of this type are carbonates and bicarbonates of the alkali- and alkaline-earth metals. As an alternative thereto, such substances can also be used which decompose thermally at the selected coating temperatures of 130° to 170° C. Substances with a decomposition temperature of 50° to 170° C. are suitable for this purpose. They can be e.g. ammonium carbonate or ammonium bicarbonate.

A further alternative resides in the use of pore-forming materials which do not decompose until at temperatures located above the coating temperatures. Such a substance is, for example, ammonium oxalate, which does not thermally decompose until 180° C. Therefore, when such pore-forming materials are used the EME unit (electrode/membrane/electrode) is briefly heated before the re-protonation to a temperature up to a maximum of 210° C. It turned out that the ionomeric material of the EME unit withstands this maximum temperature during a short-time loading up to approximately 10 minutes without damage although a long-time exposure of the material to temperatures above 180° C. results in it being useless for electrochemical purposes.

The pore-forming materials can be partially soluble in the dispersion. During the drying of the electrode coating the dissolved components crystallize out again, during which non-dissolved amounts of the pore-forming material can function as crystallization nuclei.

The method is suited both for the production of the anode and of the cathode.

The described procedures for the preparation of the gas diffusion electrode leads to a bimodal pore distribution in the electrode layer. The total porosity of 40 to 75% is composed of small pores with an average diameter up to 0.5 microns and large pores with an average diameter from 1 to 20 microns. The smaller pores are formed through the evaporation of the solvent material after the spraying of the coating dispersion on the hot membrane. The large pores are formed by the thermal decomposition or dissolving out of the pore formers. The average diameter can therefore be influenced by the particle size of the pore formers that are used in the process.

The bimodal pore distribution enables an improvement in the material transport in the electrode layer. The macro pores enable the reaction gas to quickly reach into the depth of the electrode layer and the water of reaction that is formed can be removed. The smaller pores then take over the transport in the ion conducting polymer to the catalyst particles. The distances to be travelled are only short so that the reduced speed of transport in the smaller pores does not essentially affect the performance of the electrode. A distinct improvement in the transport in the electrode layer compared to conventional coatings is only first observed with a total porosity of more than 40%. The supply of the electrode catalyst with the reaction medium is increased with increasing porosity. With increasing porosity, however, the amount of the useful electrode catalyst and the ionomer in the layer is reduced. As a result, the binding of the catalyst on the ionomer is decreased with increasing porosity as well as the ionic and electronic conductivity of the layer so that with porosities over 75% the conductivity data of the electrode layer is adversely affected.

In order to produce the coating dispersion a solution of the acidic, proton-conducting ionomer in a suitable solvent is used. Such a solution is commercially available. For example, it is a solution containing 5% by weight ionomer in a mixture of isopropanol and water in a weight ratio of 9:1. Electrocatalyst and pore-forming material are dispersed in this solution. The pore-forming material has a particle size of 0.1 to 10 $\mu$m. In order to adjust the viscosity and the evaporation rate further auxiliary agents can be added to the dispersion. Glycerol, for example, is suitable for this purpose. It is also advantageous to add tetrabutylammonium hydroxide, which can elevate the thermoplasticity and temperature stability of the electrode ionomer. Tetrabutylammonium hydroxide is preferably added to the coating dispersion as the last component.

In order to coat the membrane with the electrodes it is heated to approximately 130° to 170° C. and sprayed with the dispersion of electrocatalyst and pore former. Spraying the dispersion onto the heated membrane evaporates the volatile, inert solvents in a forced manner and dries the electrode layer. If pore-forming materials were used which already decompose at the temperatures during the coating step, the pore formation is concluded after the drying. Otherwise, an electrode layer is obtained which has at first only a certain initial porosity which can be varied by the person skilled in the art by selection of the suitable volatile, inert solvents and of the membrane temperature within narrow limits of approximately 15 to 25%. The pore formation is not completed in these instances until dissolving out of the pore-forming material during the re-protonation of the EME unit in sulfuric acid and by heating up to a maximum temperature of 210° C. following drying.

The porosity of the electrode layer can be raised up to 75% in this manner as a function of the weight ratio of the pore-forming material used to the ionomer. The weight ratio of pore-forming element/ionomer can vary in a range of 0.10:1 to 10:1. If the amount of pore-forming material is too small, the porosity of the finished electrode rises only insubstantially in relation to its initial porosity. Weight ratios of pore-forming material/ionomer of greater than 10:1 result in defective electrodes. It is preferable to use a weight ratio of 1:1.

The application of the electrode dispersion in a hot-spray method (spraying the dispersion onto the heated membrane) results, given a suitable viscosity and solid content (electrocatalyst and pore-forming material), in a well-adhering electrode layer of less than 100 $\mu$m thick and, after re-protonation, in a defined porosity.

The porosity of the electrodes can be determined pycnometrically by impregnating the electrodes with toluene in a vacuum and determining the mass absorption of toluene. The porosity P of the electrodes is calculated therefrom as the ratio of the volume of the absorbed toluene to the volume of the electrode layer, thusly:

$$P = \frac{\text{volume of the absorbed toluene}}{\text{volume of the electrode layer}} \cdot 100(\%)$$

The volume of the electrode layer results from the surface area of the electrode and the layer thickness determined independently with a scanning electron microscope.

The porosity of the electrodes of a finished EME unit is determined in detail as follows:

1. A punched-out EME disk (diameter 25 mm) is dried at 100° C. for 10 min and then weighed (weighed portion).

2. Coating over of the EME disk in a container with toluene.

3. Evacuation of the container until boiling of the toluene.

4. Ventilation of the container and dabbing the EME disk with a cloth to remove toluene on the surface of the electrodes.

5. Weighing of the EME disk impregnated with toluene (weighed analytical product).

6. Determination of the amount of toluene absorbed in the pores as the difference between weighed analytical product and weighed portion.

7. Calculation of the porosity according to the above formula taking into account the density of toluene.

The porous electrodes in accordance with the invention have a surface full of fissures. Its layer thickness can therefore only be determined as an average value from pictures made with a scanning electron microscope. This is associated in the case of highly porous layers with considerable uncertainty. In these instances the measuring errors can be reduced by normalizing the measuring with the aid of a layer having low porosity. For this purpose an EME unit without pore-forming material is manufactured and hot-pressed according to U.S. Pat. No. 5,211,984. The electrodes manufactured in this manner have a smooth surface. Their thickness can therefore be determined relatively precisely.

The porosity $P_1$ of this electrode layer is determined according to the method described above with $m_{T1}$ being the mass of the absorbed toluene and $m_{E1}$ the mass of the electrode coating. In order to determine the porosity $P_2$ of a highly porous electrode coating it is also impregnated with toluene and the masses $m_{T2}$ and $m_{E2}$ determined. However, a measuring of the layer thickness is eliminated. Rather, the porosity $P_2$ is now calculated using the measured values of the hot-pressed electrode:

$$P_2 = \left( \frac{m_{T1} m_{E2}(1 - P_1)}{m_{T2} m_{E1} P_1} + 1 \right)^{-1} \cdot 100(\%)$$

The method of the invention yields electrodes with improved substance transport properties and lower diffusion resistances of the gas diffusion electrodes on account of the advantageous macroporosity, which makes possible a higher cell performance and an improved utilization of the catalyst in an operation carried out with air compared to traditional methods. The method is economical, can be easily transferred to commercial production and also can be used with other membrane materials such as e.g. sulfonated polyether sulfone.

The following examples illustrate the method according to the invention.

In the following examples EME units in accordance with the invention (examples 1 to 3) and two EME units according to U.S. Pat. No. 5,211,974 as reference examples were produced. In all instances a surface concentration of platinum of 0.15 mg Pt/cm$^2$ was striven for.

A membrane of Nafion® 117 in the Na$^+$ form was used as solid electrolyte. The proton-conducting ionomer in the coating dispersion for the electrodes was converted by ion exchange with tetrabutylammonium hydroxide into a thermoplastic modification which resulted in a better adhesion of the coating on the polymer membrane.

The mass ratio of catalyst/ionomer in the coating dispersion was adjusted in all examples to a value of 2. The value 1 was selected for the mass ratio of pore-forming material/ionomer in the examples according to the invention.

REFERENCE EXAMPLE 1

An EME unit was produced in conformity with protocol I in U.S. Pat. No. 5,211,984 as follows: A suspension of 3.1% by weight Pt/C catalyst (30% by weight Pt on Vulcans XC-72 carbon black), 31.4% by weight of a 5% ionomer solution in 90% by weight isopropanol and 10% by weight water, 37.7% by weight glycerol, 25.2% by weight and 2.5% by weight tetrabutylammonium hydroxide was prepared and brushed onto a PTFE carrier. This electrode precursor was dried at a temperature of 150° C. The electrode precursor was then placed onto both sides of the ionomer membrane (Nafion® 117) and pressed at a temperature of 190° C. and a pressure of 100 bar. After the hot pressing the PTFE carrier was drawn off from the electrode. The electrode adhered well onto the membrane. After the re-protonation of the ionomer in 1N sulfuric acid the production of the electrodes was completed.

The finished electrodes had a thickness of 5 μm, a total porosity of 20% and a platinum charge of 0.15 mg Pt/cm$^2$.

Figure 1:
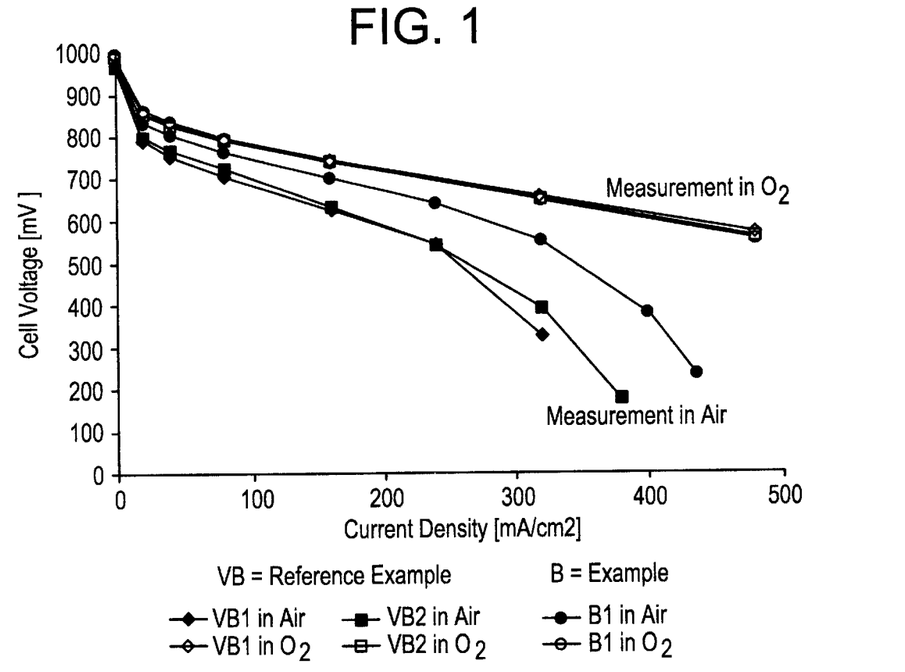
FIG. 1 shows a comparison of the performance data of the conventionally produced electrode-membrane unit of reference example 1 and reference example 2 with the performance data of the electrode-membrane unit of the invention according to example 1 with measurements with air and oxygen as cathode gas.
Figure 2:
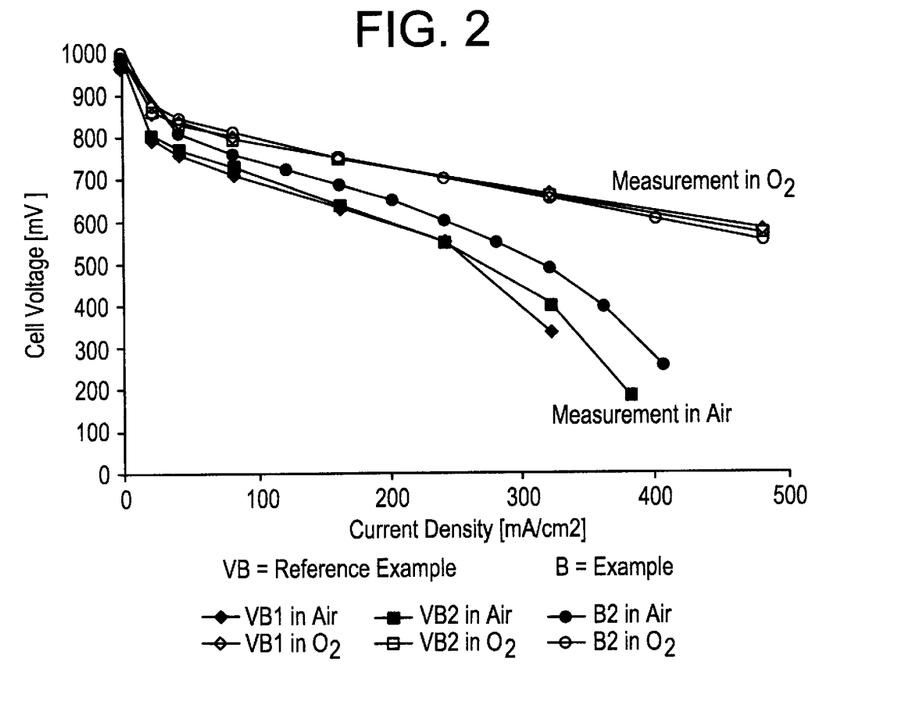
FIG. 2 shows a comparison of the performance data of the conventionally produced electrode-membrane unit of reference example 1 and reference example 2 with the performance data of the electrode-membrane unit of the invention according to example 2 with measurements with air and oxygen as cathode gas.
Figure 3:
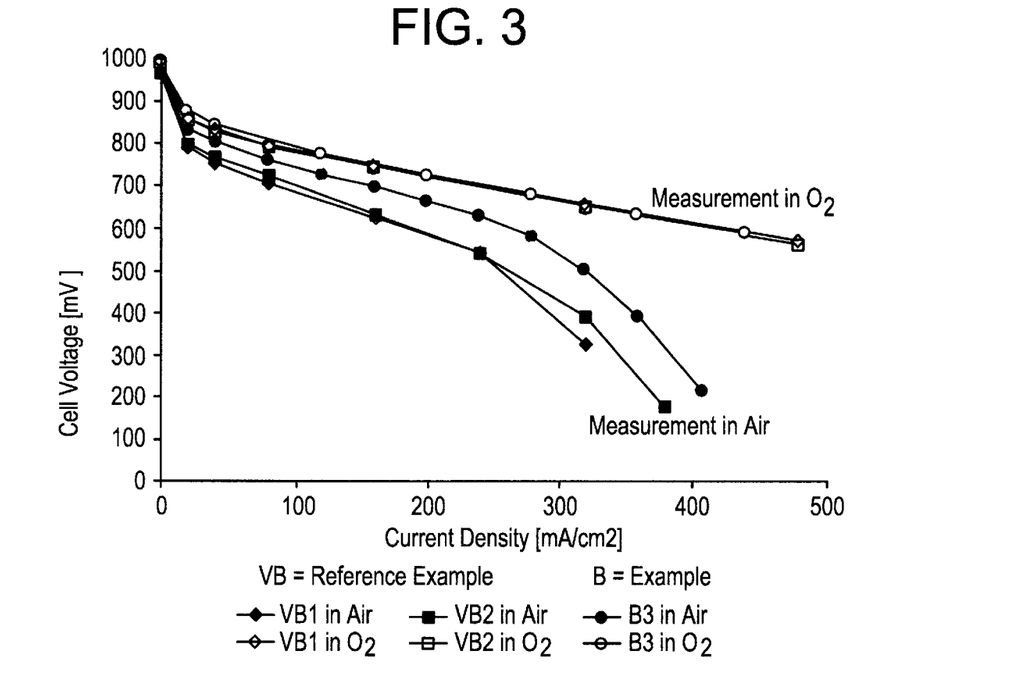
FIG. 3 shows a comparison of the performance data of the conventionally produced electrode-membrane unit of reference example 1 and reference example 2 with the performance data of the electrode-membrane unit of the invention according to example 3 with measurements with air and oxygen as cathode gas.

The current-voltage curves of such a membrane fuel cell in air operation and oxygen operation are shown in FIGS. 1 to 3.

REFERENCE EXAMPLE 2

The coating dispersion of reference example 1 was sprayed in conformity with protocol II of U.S. Pat. No. 5,211,984 onto the Nafion® 117 membrane. The spraying procedure took place by means of a template in order to obtain an electrode of the required size. This procedure can be repeated several times after a brief drying of the electrode. After the complete drying of the first electrode after approximately 20 minutes at a temperature of 150° C. the counterelectrode was applied according to the same specification. The re-protonation took place in 1N sulfuric acid. The current-voltage curves of this cell are shown for air operation and oxygen operation in FIGS. 1 to 3. The total porosity of the electrodes produced in this manner was 35%, their layer thickness 10 μm and their Pt concentration 0.15 mg Pt/cm$^2$.

REFERENCE EXAMPLE 3

A further EME unit was prepared in accordance with reference example 1. In contrast with reference example 1, a coating dispersion of 1.5 weight % Li$_2$CO$_3$ was used as the pore former.

Figure 4:
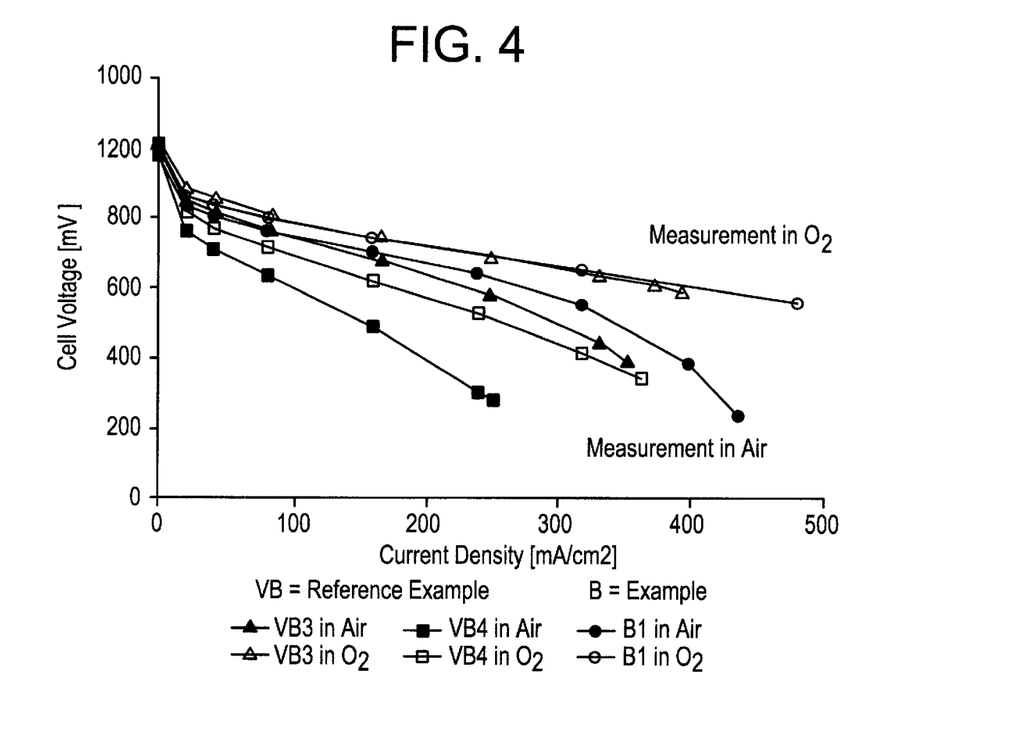
FIG. 4 shows a comparison of the performance data of the conventionally produced electrode-membrane unit of reference example 3 and reference example 4 with the performance data of the electrode-membrane unit according to example 1 of the invention with measurements with air and oxygen as the cathode gas.

The completed electrode had a thickness of about 5 microns, a total porosity of 40% as well as a platinum content of 0.15 mg Pt/cm$^2$. The current-voltage-curves of this EDE unit are shown in FIG. 4.

REFERENCE EXAMPLE 4

A mixture of catalyst containing 20% by weight platinum on Vulcan® carbon black (XC 72), ionomer solution, glycerine and a 20% solution of tetrabutyl ammonium hydroxide (TBAOH) in water was formed.

In order to obtain a consistency suitable for screen printing, a paste was prepared in a drying chamber at 40 to 50° C. Subsequently, Li$_2$CO$_3$ was added and mixed in with the printing paste. With the assistance of a three roll mixer, the mixture was then dispersed. The resulting paste had the following composition:

| | |
|---|---|
| Catalyst | 7.67% |
| Nafion ® polymer | 2.56% |
| Li$_2$CO$_3$ | 2.6% |
| TBAOH | 1.0% |
| Glycerine | 63.85% |
| Alcohol/Water | 22.32% |

The viscosity of the paste was 1.6 Pas with a shear rate of 100/s. The paste was used with a VA-steel screen (80 mesh, 150 micron emulsion strength, screen mesh surface 5 cm by 5 cm) and deposited on a Nafion 117 membrane in Na$^+$-form and dried at 140° C. This procedure was repeated so that the platinum content of 0.15 mg/cm$^2$ was achieved. Subsequently, the reverse side of the membrane was prepared in the same way.

The re-protonization and the thermal decomposition of the Li$_2$CO$_3$ followed with 1N sulphuric acid. The completed electrode had a porosity of 31% and a platinum content of 0.15 mg Pt/cm$^2$.

The current-voltage curves for the membrane fuel cell in air and also in oxygen is represented in FIG. 4 as curve VB4.

EXAMPLE 1

In order to produce an electrode-membrane unit according to the method of the invention a coating dispersion of 3.1% by weight Pt/C catalyst (30% Pt), 30.9% by weight of a 5% ionomer solution in 90% by weight isopropanol and 10% by weight water, 37.2% by weight glycerol and 24.8% by weight water, 2.5% by weight tetrabutylammonium hydroxide as well as 1.5% by weight Li$_2$CO$_3$ was sprayed according to the method described in reference example 2 onto a Nafion® 117 membrane heated to 150° C. and charged with sodium ions. The re-protonation and the decomposition of the Li$_2$CO$_3$ took place in 1N sulfuric acid. The current-voltage curves of this cell, which allow higher cell voltages and reduced substance transport resistances as well as a considerably improved utilization of catalyst in air to be attained are shown in FIG. 1. The total porosity of the electrode produced in this manner was 65%. The concentration of platinum was equal to the concentrations of the reference examples. The average layer thickness was approximately 15–20 μm.

EXAMPLE 2

Another electrode-membrane unit was produced as described in example 1. In contrast to example 1, 1.5% by weight ammonium oxalate were used as pore-forming material.

The decomposition of the pore-forming material took place after the drying of the electrode by raising the temperature of the membrane to 180° C. for a period of 5 minutes. The subsequent re-protonation was carried out as in example 1 in 1N sulfuric acid. The total porosity of the electrode produced in this manner was 48%. Layer thickness and concentration of platinum were the same as in example 1.

EXAMPLE 3

Another electrode-membrane unit was produced as described in example 1. In contrast to example 1, 1.5% by weight ammonium carbonate were used as pore-forming material.

The ammonium carbonate decomposed with the resulting formation of pores during the drying process. The re-protonation was again carried out in 1N sulfuric acid. The total porosity of this electrode was 42%. Layer thickness and concentration of platinum were the same as in example 1.

Example of Utilization

The current-voltage curves of the electrode-membrane units produced in the above examples were recorded galvanostatically in a quasi-stationary manner. To this end the EME units were coated on both sides with graphite paper as gas distributor and current collector and clamped in a graphite cell block. The active electrode surface area was 25 $cm^2$.

The cell temperature was maintained constant at 75° C. during the measurements. The hydrogen current on the anode side was 300 ml/min at a pressure of 1 bar and was humidified with water vapor in accordance with the equilibrium vapor pressure at 85° C. On the cathode side the cell was supplied with dry air or pure oxygen with a volume flow of 300 ml/min and 150 ml/min, respectively.

FIGS. 1 to 4 show the measured current-voltage curves of the electrode-membrane units of examples 1 to 3 (B1, B2, B3) in accordance with the invention in comparison to the current-voltage curves of the electrode-membrane units of reference examples 1 to 4 (VB1, VB2, VB3).

Figure 5:
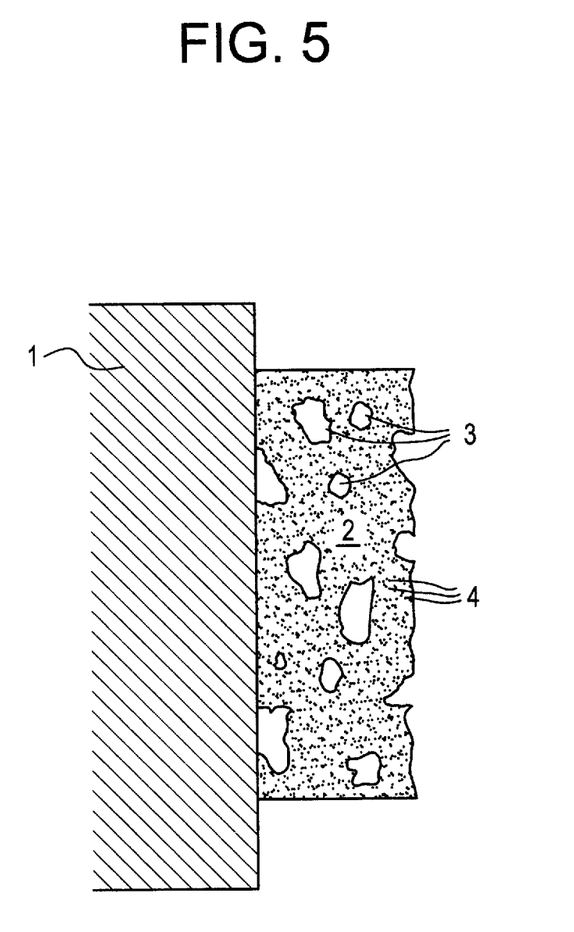
FIG. 5 is a schematic representation of the cross-section of the electrode layer according to the invention.

FIG. 5 shows a schematic cross-section through an electrode layer according to the invention. The polymer membrane (1) and the electrode layer (2) are shown not necessarily to scale. The electrode is formed of an ion conducting polymer and a finely divided platinum/carbon catalyst particle which is not shown in FIG. 5. The pores of the layer are formed of small pores (4) which are formed through the evaporation of the solvent material and large pores (3). The large pores are formed through the thermal decomposition and/or dissolving of the pore formers.

The electrode-membrane units of the invention exhibit considerably improved performance data in air operation on account of their high porosity.

This is true also with regard to reference examples which both were prepared using pore formers in the coating dispersion in a hot press procedure (VB3) and in a screen pressing procedure (VB4).

Through the procedure of the present invention utilizing hot spray and pore formers it is possible to arrive at porosities of over 40% with improved performance data in air which were not obtainable heretofore.

Further variations and modifications of the foregoing will be apparent to those skilled in the art and are intended to be encompassed by the claims appended hereto.

German priority application 196 11 510.8 is relied on and incorporated herein by reference.

We claim:

1. A gas diffusion electrode for use in membrane fuel cells consisting essentially of a proton-conducting polymer having dispersed therein a finely divided electrocatalyst, said electrode having a total porosity in a range more than 40 to less than 75% by volume.

2. The gas diffusion electrode according to claim 1, wherein said electrocatalyst comprises platinum in a range of 0.01 to 4 mg Pt/$cm^2$.

3. The gas diffusion electrode according to claim 2 wherein said electrocatalyst is an alloy of platinum and at least one metal selected from the group consisting of cobalt, chromium, tungsten, molybdenum, iron, copper, nickel and ruthenium.

4. The gas diffusion electrode according to claim 3 wherein said alloy contains platinum, cobalt and chromium.

5. The gas diffusion electrode according to claim 1, wherein said electrode has a thickness in a range of 5 to 100 μm.

6. The gas diffusion electrode according to claim 1 wherein said proton-conducting polymer is a perfluorocarbon polymer.

7. The gas diffusion electrode according to claim 6 wherein said perfluorocarbon polymer is a fluorocarbon vinyl ether copolymer.

8. The gas diffusion electrode according to claim 1 which has a bimodal pore distribution and wherein the total porosity of more than 40% to less than 75% is composed of small pores with an average diameter of up to 0.5 microns and large pores with an average diameter of 1 to 20 microns.

9. A fuel cell comprising a membrane and gas diffusion electrode wherein said electrode consists essentially of a proton-conducting polymer containing a finely divided electrocatalyst dispersed in said proton-conducting polymer, said electrode composition having a total porosity in a range more than 40 to less than 75% by volume.

10. The fuel cell according to claim 9, wherein said electrocatalyst comprises platinum in a range of 0.01 to 4 mg Pt/$cm^2$.

11. The fuel cell according to claim 9, wherein said electrode has a thickness in a range of 5 to 100 μm.

12. A method for producing a porous gas diffusion electrode for membrane fuel cells on an ion-conducting polymer membrane comprising coating the membrane with a dispersion of a finely divided electrocatalyst and at least one pore-forming material in a solution of an ion-conducting polymer, said polymer membrane being in a non-acidic, temperature-stable state, heating said membrane during said coating to a temperature in a range of 130° to 170° C., drying said membrane, re-protonating said membrane and said coating with an acid, wherein the pore-forming material is in finely divided form with an average particle size of 0.1 to 10 μm.

13. The method according to claim 12, wherein the pore-forming material is soluble in said acid.

14. The method according to claim 13, wherein the pore former is a carbonate of the alkali- or alkaline-earth metals.

15. The method according to claim 12, wherein the pore-forming material is thermally decomposable in a temperature range of 50° to 170° C.

16. The method according to claim 15, wherein the pore-forming material is ammonium carbonate.

17. The method according to claim 12, wherein the pore-forming material is thermally decomposable in a temperature range of 170° to 210° C. and the electrode coating is heated before the re-protonating for a period of up to 5 minutes to a temperature of up to 210° C.

18. The method according to claim 17, wherein the pore-forming material is ammonium oxalate.

19. The method according to claim 12, wherein the mass ratio of soluble ionomer and pore-forming material in the coating dispersion is selected in a range of 0.01:1 to 10:1.

20. The method according to claim 12, wherein the mass ratio of soluble ionomer and pore-forming material in the coating dispersion is selected in a range of preferably 1:1 to 1:2.

21. A method for producing a porous gas diffusion electrode for membrane fuel cells on an ion-conducting polymer membrane comprising coating the membrane with a dispersion of a finely divided electrocatalyst and at least one pore-forming material in a solution of an ion-conducting polymer, said polymer membrane being in a non-acidic, temperature-stable state, heating said membrane during said coating to a temperature in a range of 130° to 170° C., drying said membrane, re-protonating said membrane and coating said membrane with an acid, wherein the pore-forming material is in finely divided form with an average particle size of 0.1 to 10 $\mu$m, said electrode having a total porosity of more than 40 to less than 75% and composed of a bimodal distribution of small pores with an average diameter up to 0.5 microns and large pores with an average diameter from 1 to 20 microns.

22. A coating composition for preparing a gas diffusion electrode consisting essentially of a dispersion of an acidic, ion-conducting polymer in a solvent therefor, at least one finely divided noble metal containing electrocatalyst and at least one pore-forming material, said composition being free of a hydrophobic polymer.

23. The coating composition according to claim 22 wherein the noble metal is platinum or an alloy thereof with a particle size of 2 to 10 nm.

24. The coating composition according to claim 23 wherein the noble metal is deposited on carbon black.

25. The coating composition according to claim 22 wherein the pore-forming material is a carbonate or bicarbonate of an alkali metal or alkaline-earth metal.

26. The coating composition according to claim 22 wherein the pore-forming material is ammonium carbonate or ammonium bicarbonate.

* * * * *